United States Patent [19]
Corcoran

[11] Patent Number: 4,680,210
[45] Date of Patent: Jul. 14, 1987

[54] REPOSITIONABLE DIRECTIONAL MARKERS

[76] Inventor: Dan E. Corcoran, 4640 Scenic Ave., Central Point, Oreg. 97502

[21] Appl. No.: 862,108

[22] Filed: May 12, 1986

[51] Int. Cl.$^4$ ................................................ B32B 7/06
[52] U.S. Cl. ........................................ 428/42; 428/77; 428/194; 206/460; 206/820; 206/813; 116/235; 283/37; 283/38
[58] Field of Search ....................... 428/40, 41, 42, 77, 428/194; 283/37–40; 116/235, 236; 281/42; 206/460, 820, 813

[56] References Cited

U.S. PATENT DOCUMENTS 3,583,358 6/1971 Hanson ............................ 206/460 X

*Primary Examiner*—Alexander S. Thomas
*Attorney, Agent, or Firm*—Chernoff, Vilhauer, McClung & Stenzel

[57] ABSTRACT

An elongate directional marker has a triangular head and an elliptical body. Low-tack repositionable adhesive applied to the head of the marker enables the marker to be repeatedly reused. The markers are manufactured in an array by pattern-gluing adhesive strips to face stock, laminating a liner to the face stock and die cutting the markers out of the face stock so that the triangular heads of the markers are intermeshed in alternating orientation on the adhesive strips.

8 Claims, 11 Drawing Figures

REPOSITIONABLE DIRECTIONAL MARKERS

BACKGROUND OF THE INVENTION

This invention relates to a stationery product and more particularly to repositionable, reusable directional markers which include a directional portion having low-tack, repositionable adhesive thereon and which are configured to be highly functional, economically produced and attractively dispensed.

Rectangular repositionable notes having low-tack repositionable adhesive on a portion of the underside of the note are a very popular stationery item and have many useful applications at home, office or school. The low-tack repositionable adhesive enables the notes to be lifted off and repositioned on the same or another underlying object. Applying the adhesive to only a portion of the underside of the note permits the note to be conveniently grasped, lifted and repositioned by manipulating the portion of the note without the adhesive. Such notes typically come in a compact pad with each note releasably attached to the underlying note in the pad. However, such notes are typically rectangular in shape and do not serve to indicate direction, the sharp corners of the rectangular notes tending to catch upon other papers in the clutter and shuffle of ordinary use.

The lack of repositionable directional markers is probably due to perceived problems in the production and dispensing of such markers.

SUMMARY OF THE INVENTION

The present invention provides a repositionable elongate directional marker having a directional portion at one end and a non-directional portion at the other end. Low-tack, repositionable adhesive is applied to the directional portion, while the non-directional portion is substantially free of the adhesive. The elongate configuration provides an appropriate space for notations. The end of the elongate marker including the non-directional portion is defined by a curved, regular, smooth margin, free of projecting corners which might catch on other papers. The preferred embodiments of the marker are further characterized by a reduced neck between the non-directional portion and the directional portion.

The shape of the marker facilitates an efficient and inexpensive manufacturing process. The expensive low-tack adhesive is applied to the face stock in an elongate strip. Thereafter an array of markers are cut from the face stock so that the directional portions of the markers are cut from the portion of the face stock including the adhesive strip while the non-directional portions are cut from the face stock on either side of the adhesive strip. The resulting array provides an attractive and convenient configuration to market and dispense the markers.

Accordingly, it is a principal object of the present invention to provide a repositionable directional marker.

It is a further object of the present invention to provide such a marker having a directional and non-directional portion.

It is an associated object of the present invention to provide such a marker having a reduced neck between the directional and non-directional portions.

It is another object of the present invention to provide such a marker having low-tack repositionable adhesive applied to the directional portion of the marker.

It is a related object of the present invention to provide a marker adapted to receive notations thereon.

It is an associated object of the present invention to provide a marker having a pleasing and functional shape.

It is another object of the present invention to provide an elongate marker which has a regular curved margin on the end opposite the directional portion.

It is a further object of the present invention to provide an inexpensive and efficient method of manufacturing the marker.

It is a related object of the present invention to provide an array of such markers well-suited for appearance and functionality.

The foregoing and other objectives, features and advantages of the present invention will be more readily understood upon consideration of the following detailed description of the invention taken in conjunction with the accompanying drawings.

Figure 5:
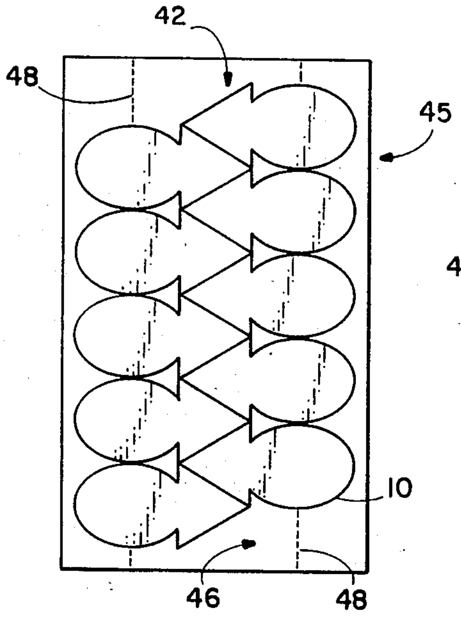
FIG. 5 shows a card having an array of markers with their directional portions intermeshed.

FIGS. *7a–c* illustrate some of the steps in the process of producing the array shown in FIG. 5.

Figure 8:
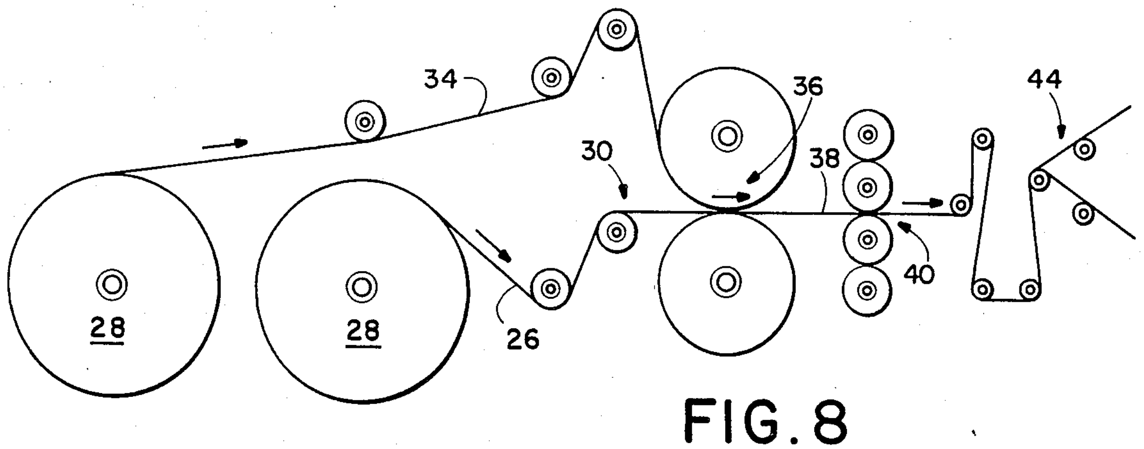

FIG. 8 is a schematic elevation view of the manufacturing process illustrated in FIGS. *7a–c*.

Figure 9:
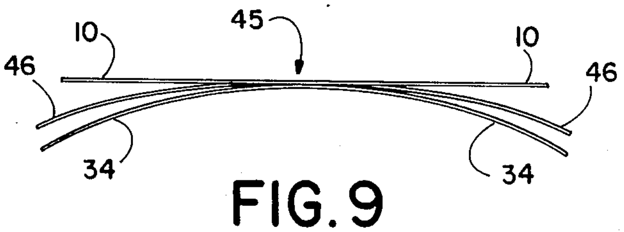

FIG. 9 is an end elevation of the card of FIG. 5 which is bent into convex configuration.

DETAILED DESCRIPTION OF THE INVENTION

Figure 1:
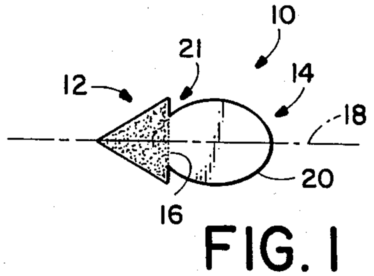
FIG. 1 illustrates an exemplary marker.

Referring to FIG. 1, an exemplary embodiment of the repositionable, elongate directional marker 10 includes a directional head 12 at one end and a nondirectional body 14 at the other end. The exemplary marker is substantially planar, having a top side and a bottom side. The bottom side of the head includes a low-tack repositionable adhesive 16 which enables the marker to be repeatedly released and reapplied to an object. The elongate shape of the marker provides an elongate, appropriately shaped, space for making notations on the top side of the marker without needlessly obscuring the underlying object. Note that the directional head of the exemplary marker directs attention along the axis 18 of the marker.

The body of the marker is free of adhesive and accordingly may be conveniently grasped to remove the marker from its underlying object and reposition the marker on the same object or apply it to another object. The end of the marker incorporating the body is defined by a regular, smooth, curved margin 20 free of projecting corners which could catch on other papers and tear, remove, or disfigure the marker.

The exemplary embodiment of FIG. 1 includes a reduced neck 21 interconnecting the head and body. In actuality the reduced neck is part of the curved end of the elliptically shaped body. The reduced neck has several purposes. It serves to set off and accentuate the directional portion of the marker thereby emphasizing the directional function of the marker. Additionally, it also provides a natural place for the marker to bend when a finger or other tool is inserted under the body of the marker preparatory to grasping and removing the marker. Bending of the marker at the neck permits the marker to remain applied to the underlying object until it is firmly grasped. Without such reduced neck the marker is liable to flip off the underlying object before the body has been securely grasped.

Figure 2:
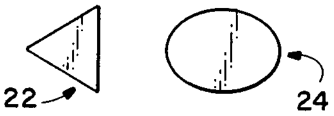
FIG. 2 shows the design components of the marker of FIG. 1.

The design components of the exemplary marker of FIG. 1 are shown in FIG. 2. They comprise a triangle 22 and an ellipse 24.

Figure 3:
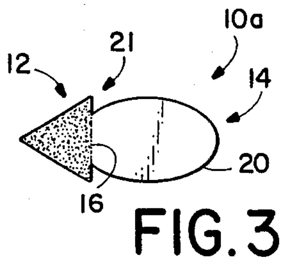
FIG. 3 illustrates another exemplary marker.
Figure 4:
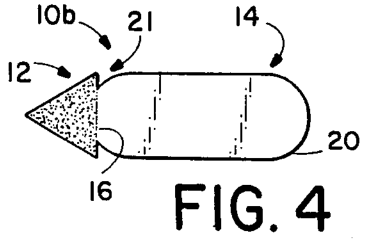
FIG. 4 illustrates a further exemplary marker.

FIGS. 3 and 4 show further exemplary embodiment 10*a* and 10*b* of the marker of the present invention. These exemplary embodiments are also elongate and include a directional head 12 at one end and a non-directional body 14 at the other end joined together by a reduced neck. Low-tack adhesive 16 is applied to the bottom side of the head of these markers. Note that although the body of the markers shown in FIGS. 3 and 4 is relatively longer than the body of the marker of the exemplary embodiment shown in FIG. 1, the end of the marker opposite the head is again characterized by a curved, smooth, regular margin devoid of corners.

The present invention includes a process for efficiently and economically producing an array of markers. The resulting array provides an attractive and practical configuration for distributing, packaging, displaying and dispensing the markers. The process and the array will be explained with reference to FIGS. 5–9.

Figure 6:
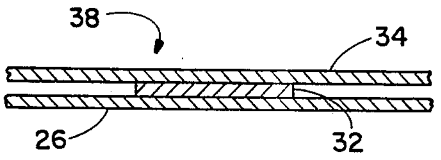
FIG. 6 is a partial cross-sectional view of the laminate including face stock, adhesive and liner.
Figures 7A, 7B, 7C:
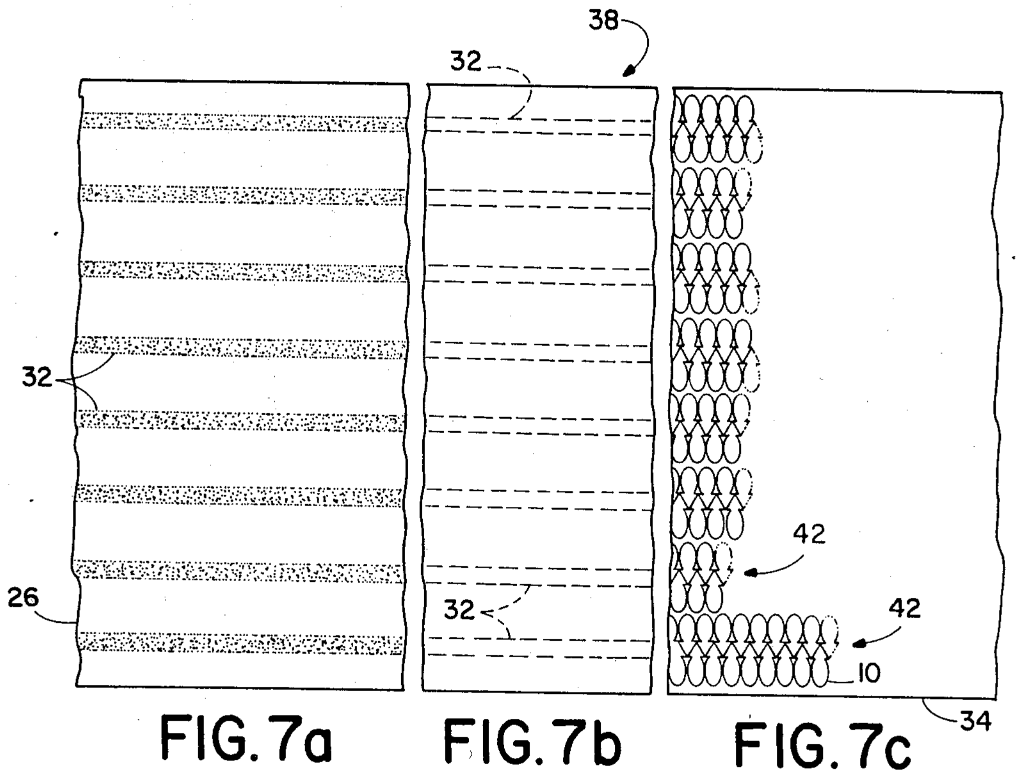

Referring to FIGS. 6–8, an elongate sheet of face stock 26 is fed from a roll 28 past a gluing station 30 where low-tack, repositionable adhesive is "pattern-glued" onto one side of the face stock in a plurality of elongate adhesive strips 32, most readily seen in FIG. 7*a*, arranged substantially parallel to the elongate sheet of face stock. An elongate sheet of liner 34 is fed from a second roll 28 to a laminating station 36 where it is joined into a laminate 38 with the face stock, the adhesive strips 32 interposed between the face stock and the liner as shown in FIGS. 6 and 7*b*. The laminate is then passed to a die cutting station 40 where the face stock portion of the laminate is cut by a rotary die cutter into a plurality of arrays 42 of markers each array centered upon one of the adhesive strips. The die cutter does not cut the liner. Alternatively, the laminate may be preassembled into a roll of pattern-glued "pressure sensitive" paper and fed directly to the die cutting station. Another alternative would include printing the face stock of the laminate or of the pressure sensitive paper prior to die cutting to add a message, logo or the like to the individual markers.

Thereafter, the laminate may be passed to a stripping station 44 where the excess face stock is stripped away from the laminate leaving continuous arrays 42 of markers adhering to the liner along the adhesive strips as partially shown in FIG. 7*c*. Such continuous arrays of markers with the excess face stock stripped away may be cut into rows, each row including one continuous array, and the rows assembled into compact rolls which may be dispersed like stamps.

Alternatively, the die cut laminate may be sent to a sheeting station, not shown, where the die cut laminate is cut into sheets, strips, or cards. FIG. 5 shows a card 45 including an array 42 of markers, and the excess face stock 46. To create the card shown in FIG. 5, the die cutter cuts the markers in arrays of ten markers and also cuts serrated lines 48 in the face stock to facilitate removal of the excess face stock 46. A plurality of cards such as shown in FIG. 5 may be fastened together into a pad of cards. To remove individual markers from the array, each card may be grasped by its elongate sides and squeezed so that the face of the card is convex and the bodies 14 of the markers 10 in the array stand out from the card where they may be conviently grasped as shown in FIG. 9.

Referring to FIGS. 5 and 7*c* it will be seen that each array 42 of markers includes an elongate row of markers having their triangular heads adjacent to one another and intermeshed on the adhesive strip, the bodies of the markers forming two rows, parallel to and on either side of the adhesive strip. It should be noted that this arrangement, with the triangular intermeshed heads pointing in the opposite direction from adjacent heads, permit all of the adhesive strip to be encompassed by the triangular heads of the markers, the intermeshed triangular heads together approximating the adhesive strip. Since the low-tack, repositionable adhesive is relatively expensive, the process and array described above is an efficient use of the expensive glue. It should also be noted that the face stock is also efficiently used by this process and array by making the bodies of the markers approximately the same width as the heads. It will be appreciated that while the bodies may be of other dimensions, bodies wider than the heads would result in waste of the expensive glue, while bodies narrower than the heads would result in waste of face stock.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A stationary product comprising:

(a) a sheet of stock;

(b) an elongate adhesive strip of releasable, reusable adhesive arranged on said stock;

(c) said stock including an array of discrete elongate directional markers formed therefrom, said markers arranged substantially perpendicular to said elongate strip;

(d) each of said markers including a directional portion proximate one end, said directional portions of said markers arranged on said adhesive strip;

(e) each of said markers in said array including a non-directional portion, said non-directional portions of said markers in said array defining a pair of elongate rows parallel to and on either side of said adhesive strip; and (f) said directional portions of said markers are arranged adjacent to each other and intermesh with, and point in the opposite direction from, said adjacent directional portions.

2. The product of claim 1 wherein said adhesive strip includes substantially regular, substantially parallel, spaced apart margins, each of said directional portions of said markers in said array includes a substantially triangular head, said triangular heads of said markers in said array collectively approximating said adhesive strip.

3. The product of claim 1 including a sheet of liner arranged adjacent to and substantially coplanar with said sheet of stock so as to position said adhesive strip therebetween, said liner, stock and adhesive strip cooperating as means for causing said non-directional portions of said markers of said array to project away from said liner and said stock when said liner is bent along said adhesive strip.

4. The product of claim 1, wherein said markers of said array include a reduced neck between said directional portion and said non-directional portion.

5. A stationery product comprising:

(a) an elongate laminate including a sheet of face stock superimposed on a sheet of carrier;

(b) said laminate including an elongate median strip of releasable, reusable adhesive arranged on said face stock facing said carrier;

(c) said stock including an array of discrete elongate directional markers formed therefrom;

(d) each of said markers including a directional portion and a non-directional portion; and (e) said markers arranged perpendicular to said median strip so that said directional portions of said markers are superimposed on said median strip and are adjacent to each other with said adjacent directional portions pointing in opposite directions.

6. The product of claim 5 wherein said directional portions of said markers are intermeshed with said adjacent directional portions.

7. The product of claim: 5 wherein said elongate median strip has substantially regular, substantially parallel, spaced apart margins, said directional portions of said markers are substantially triangular, the combined directional portions of said markers in said array substantially approximating said elongate median strip.

8. The product of claim 5 wherein said non-directional portions of said markers in said array define a pair of elongate rows parallel to and on either side of said elongate median strip.

* * * * *

UNITED STATES PATENT AND TRADEMARK OFFICE
CERTIFICATE OF CORRECTION

PATENT NO. : 4,680,210

DATED : July 14, 1987

INVENTOR(S) : Dan E. Corcoran

It is certified that error appears in the above-identified patent and that said Letters Patent is hereby corrected as shown below:

Col. 3, Line 12 Change "embodiment" to --embodiments--.

Col. 6, Line 7 Change "claim:" to --claim--.

Signed and Sealed this

First Day of March, 1988

*Attest:*

DONALD J. QUIGG

*Attesting Officer* *Commissioner of Patents and Trademarks*